(12) United States Patent
Dana

(10) Patent No.: US 9,809,111 B1
(45) Date of Patent: Nov. 7, 2017

(54) ANTI-SIPHON DEVICE

(71) Applicant: Samuel J. Dana, Princeton, ME (US)

(72) Inventor: Samuel J. Dana, Princeton, ME (US)

( * ) Notice: Subject to any disclaimer, the term of this patent is extended or adjusted under 35 U.S.C. 154(b) by 0 days.

(21) Appl. No.: 15/359,267

(22) Filed: Nov. 22, 2016

(51) Int. Cl.
  *B65D 3/00* (2006.01)
  *B60K 15/04* (2006.01)
  *B65D 88/54* (2006.01)

(52) U.S. Cl.
  CPC .......... *B60K 15/0403* (2013.01); *B65D 88/54* (2013.01); *B60K 2015/047* (2013.01)

(58) Field of Classification Search
  CPC .... B60K 15/03; B60K 15/04; B60K 15/0403; B60K 2015/048; B60K 2015/04; B60K 2015/03; B60K 2015/047–2015/0496; B65D 88/54; B65D 7/00; B65D 88/128; B65D 88/748; B65D 90/34; B65D 90/52
  USPC ... 220/86.1–86.4, 562, 565–567.3, 581–592, 220/4.12–4.15, 905
  See application file for complete search history.

(56) References Cited

U.S. PATENT DOCUMENTS

| | | | |
|---|---|---|---|
| 1,787,250 A | 12/1930 | Hughes | |
| 1,808,245 A | 6/1931 | Middleton | |
| 1,813,554 A | 7/1931 | Wickline | |
| 1,971,714 A | 8/1934 | Harkness | |
| 2,041,070 A | 5/1936 | Jones | |
| 3,002,649 A | 10/1961 | Turley | |
| 3,985,259 A | 10/1976 | Zell et al. | |
| 4,295,577 A | 10/1981 | Schmid et al. | |
| 4,344,544 A | 8/1982 | Austin | |
| 4,630,748 A | 12/1986 | Keller | |
| 4,650,087 A | 3/1987 | White | |
| 5,025,946 A | 6/1991 | Butkovich et al. | |
| 5,171,455 A * | 12/1992 | Wang ................... | B01D 1/0082 159/4.01 |
| 7,040,360 B2 | 5/2006 | Watson | |
| 9,365,108 B2 | 6/2016 | Watson et al. | |
| 2005/0205156 A1* | 9/2005 | Ganachaud ............ | B60K 15/04 141/286 |
| 2009/0078627 A1* | 3/2009 | Jannot .................... | B60K 15/03 210/120 |
| 2010/0147863 A1* | 6/2010 | Grun ................ | B60K 15/03504 220/746 |
| 2010/0224260 A1* | 9/2010 | Avakian ............. | B60K 15/0403 137/13 |
| 2011/0209789 A1* | 9/2011 | Murabayashi ......... | B60K 15/03 137/899 |
| 2013/0092290 A1 | 4/2013 | Waymire et al. | |
| 2013/0213364 A1* | 8/2013 | Koukan ........... | B60K 15/03519 123/518 |

* cited by examiner

*Primary Examiner* — Kareen Thomas
(74) *Attorney, Agent, or Firm* — Anthony D. Pellegrini

(57) ABSTRACT

An anti-siphon device configured to be used within the fuel filler pipe of a heating oil fuel tank, the device having a rigid body member that fits within an intermediate section of the fuel filler pipe and a restriction element having apertures allowing fuel but not a siphon hose to pass through; and a method of installing the anti-siphon device in a fuel filler pipe.

20 Claims, 5 Drawing Sheets

ANTI-SIPHON DEVICE

BACKGROUND OF THE INVENTION

1. Technical Field

The present invention relates generally to an apparatus for use with fuel tank systems, and specifically is directed to a device to prevent the siphoning of fuel oil from heating oil fuel tanks.

2. Description of Prior Art

Liquid fuel, whether heating oil or gasoline or the like, is typically stored in fuel tanks. Fuel tanks for heating oil are typically located within structures, such as residential homes or commercial buildings. Fuel tanks for gasoline are typically built into automobiles. For both types of fuel, each of which can be quite expensive, there is a risk of unauthorized persons removing that fuel from the fuel tanks where it is stored. This unauthorized removal is often accomplished by use of a siphon hose. A siphon hose is inserted into the fuel tank through the fuel filler pipe until the distal end of the siphon hose is submerged within the fuel, and then the fuel is drawn out of the fuel tank through the siphon hose. Such unauthorized removal of fuel can have severe detrimental economic impact on persons. In addition to the value of the fuel itself, the unauthorized removal of heating oil, for example, can lead to the failure of heating systems during cold periods, potentially resulting in frozen pipes and significant damage to the premises. In addition, persons subject to a lack of heat due to lack of fuel may suffer harm to their health and well-being.

One method for preventing the unauthorized removal of fuel from fuel tanks is to secure the entry point to the fuel tanks. This entry point is typically an opening located at the proximate end of the fuel filler pipe. By securing the proximate end of the fuel filler pipe, for example, by placing a lock on a cover placed over the proximate end of the fuel filler pipe, unauthorized access is prevented. This method has been used successfully with automobile fuel tanks, which are typically refilled by the driver who has the key for unlocking the cover. However, because heating oil fuel tanks are typically refilled by delivery persons, and often when the owner of the fuel tank is not available, requiring a key to unlock the covers is impractical.

Another method for preventing the unauthorized removal of fuel from fuel tanks is to place some type of barrier between the proximate end of the fuel filler pipe and the fuel tank. This barrier must be configured to allow for the passage of fuel but not the passage of a siphon hose. This method has been used with automobile fuel tanks as well. The prior art is replete with examples of devices that achieve this purpose. Each of these devices incorporates some sort of securing component intended to maintain the barrier in place within the fuel filler pipe and prevent it from being either pulled out of the fuel filler pipe or forced down through the fuel filler pipe into the fuel tank. However, none of these devices are configured for use with heating oil fuel tanks.

Heating oil fuel tanks, unlike automobile gasoline fuel tanks, are quite large and physically located a significant distance from the fuel filler opening at the proximate end of the fuel filler pipe. In order to span that distance, the fuel filler pipe is typically segmented, with sections joined together to achieve the proper length. Sections are often oriented at various angles to each other in order to construct a fuel filler pipe having an appropriate configuration for the physical space in which it is located. These angles are typically achieved by the use of angled elbow fittings interposed between sections of the fuel filler pipe. None of these features are found in gasoline fuel filler pipes, and thus the devices created for those fuel tanks are not practical for use with heating oil fuel tanks.

Therefore, what is needed is an effective barrier device for use with heating oil fuel tanks to prevent the unauthorized siphoning of fuel from those tanks.

It is therefore an object of the present invention to provide an anti-siphoning device for use with fuel tanks.

It is another object of the present invention to provide an anti-siphoning device for use within the segmented fuel filler pipes of heating oil fuel tanks.

It is yet another object of the present invention to provide an anti-siphoning device that cannot be easily extracted from a fuel filler pipe or forced through a fuel filler pipe.

It is yet another object of the present invention to provide an anti-siphoning device that does not need to be secured to a fuel filler pipe.

It is yet another object of the present invention to provide an anti-siphoning device that is easy to manufacture.

It is yet another object of the present invention to provide an anti-siphoning device that is inexpensive.

It is yet another object of the present invention to provide a method for installing an anti-siphoning device into the fuel filler pipe of a heating oil fuel tank.

Other objects and advantages of the present invention will become obvious to the reader and it is intended that these objects and advantages are within the scope of the present invention. To the accomplishment of the above and related objects, this invention may be embodied in the form illustrated in the accompanying drawings. Attention is called to the fact, however, that the drawings are illustrative only, and that changes may be made in the specific construction illustrated and described within the scope of this disclosure.

SUMMARY OF THE INVENTION

One embodiment of the present invention is an anti-siphon device configured to be used within the fuel filler pipe of a heating oil fuel tank. The anti-siphon device comprises a rigid body member that fits within an intermediate section of the fuel filler pipe. The body member is open at both ends, but has a restriction element in its distal ("downstream") end. The restriction element has apertures allowing fuel to pass through, but the apertures are sized too small for the end of a siphon hose to pass through. The body member has a diameter just slightly less than the inside diameter of the fuel filler pipe, so that a siphon hose cannot be passed around it. The length of the body member is short enough so that it fits within the intermediate section of the fuel filler pipe but too long to pass through the elbow fittings at either end of the intermediate section of the fuel filler pipe. Thus, one cannot draw the anti-siphon device out of the fuel filler pipe or forced it down through the fuel filler pipe into the fuel tank.

Another embodiment of the present invention is a method of installing an anti-siphon device in a fuel filler pipe. The method involves detaching the proximate section of the fuel filler pipe from the elbow fitting of the intermediate section of the fuel filler pipe, detaching the elbow fitting from the intermediate section of the fuel filler pipe, inserting the anti-siphon device into the intermediate section of the fuel filler pipe, reattaching the elbow fitting to the intermediate section of the fuel filler pipe, and reattaching the proximate section of the fuel filler pipe to the elbow fitting of the intermediate section of the fuel filler pipe. This method does not otherwise involve securing the anti-siphon device to the fuel filler pipe and requires no modification to the fuel filler pipe.

Various other objects, features and attendant advantages of the present invention will become fully appreciated as the same becomes better understood when considered in conjunction with the accompanying drawings.

DETAILED DESCRIPTION OF THE INVENTION

Figure 1:
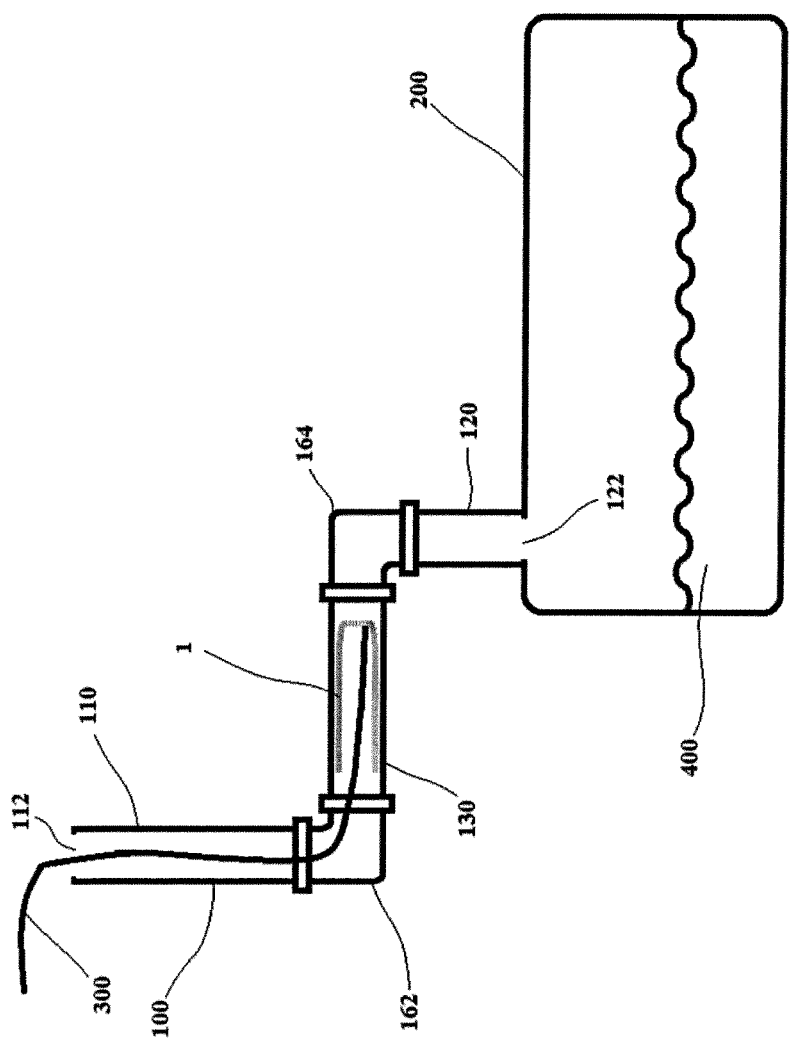
FIG. 1 is a schematic side view of the device of the present invention being used in the fuel tank/fuel filler pipe configuration contemplated by the invention.

The anti-siphon device 1 of the present invention is designed to work with a conventional fuel tank 200 and fuel filler pipe 100 having a specific configuration, as is typically found in a residential home. In this configuration, the fuel tank 200 is often located in a basement, and the fuel filler pipe 100 must therefore pass from the exterior of the structure into the interior of the structure. The fuel filler pipe 100 is therefore comprised of several straight sections connected at angles to each other. Specifically, the fuel filler pipe 100 is configured to have a proximate section 110, an intermediate section 130, and a distal section 120. See FIG. 1. The intermediate section 130 of the fuel filler pipe 100 is oriented at a first angle 142 to the proximate section 110 of the fuel filler pipe 100; typically, this first angle 142 is ninety degrees, though it could be a different angle, such as one hundred thirty-five degrees. The intermediate section 130 of the fuel filler pipe 100 is oriented at a second angle 144 to the distal section 120 of the fuel filler pipe 100; again, typically, this second angle 144 is ninety degrees, though it also could be a different angle, especially when the first angle 142 is other than ninety degrees. For example, where the first and second angles 142,144 are each ninety degrees, the proximate section 110 of the fuel filler pipe 100 is oriented substantially vertically, the intermediate section 130 of the fuel filler pipe 100 is oriented substantially horizontally, and the distal section 120 of the fuel filler pipe 100 is oriented substantially vertically. Where the first and second angles 142,144 are each one hundred thirty-five degrees, the proximate section 110 of the fuel filler pipe 100 is oriented substantially vertically, the intermediate section 130 of the fuel filler pipe 100 is oriented at a forty-five degree angle to the horizontal, and the distal section 120 of the fuel filler pipe 100 is oriented substantially vertically. Where the first angle 142 is one hundred thirty-five degrees and the second angle 144 is ninety degrees, the proximate section 110 of the fuel filler pipe 100 is oriented at a forty-five degree angle to the horizontal, the intermediate section 130 of the fuel filler pipe 100 is oriented substantially horizontally, and the distal section 120 of the fuel filler pipe 100 is oriented substantially vertically. Other configurations of the fuel filler pipe 100 are also contemplated.

The fuel filler pipe 100 has an opening 112 in its proximate section 110 suitable for receiving fuel 400. The distal section 120 of the fuel filler pipe 100 has an opening 122 which is in communication with the fuel tank 200. The intermediate section 130 of the fuel filler pipe 100 may have a first elbow fitting 162 at its proximate end and a second elbow fitting 164 at its distal end to allow the intermediate section 130 of the fuel filler pipe 100 to be removably connected to the proximate section 110 of the fuel filler pipe 100 and the distal section 120 of the fuel filler pipe 100.

Figure 2:
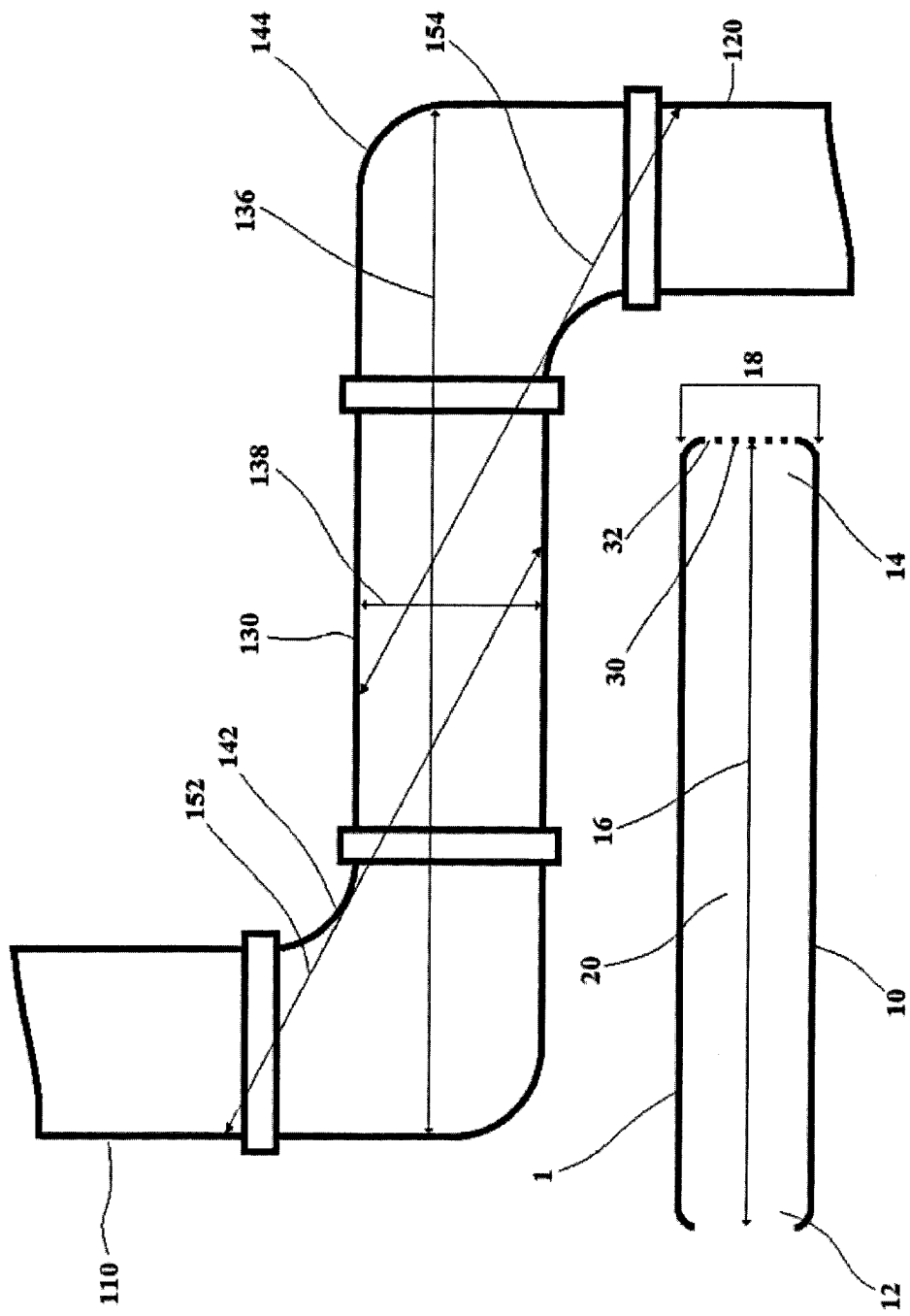
FIG. 2 is a schematic side view of a fuel filler pipe and the device of the present invention.

Because of the first angle 142 between the proximate section 110 of the fuel filler pipe 100 and the intermediate section 130 of the fuel filler pipe 100, there is a limited straight line distance between the proximate section 110 of the fuel filler pipe 100 and the intermediate section 130 of the fuel filler pipe 100. The longest such straight line distance is designated the first distance 152. See FIG. 2. Similarly, because of the second angle 144 between the intermediate section 130 of the fuel filler pipe 100 and the distal section 120 of the fuel filler pipe 100, there is a limited straight line distance between the intermediate section 130 of the fuel filler pipe 100 and the distal section 120 of the fuel filler pipe 100. The longest such straight line distance is designated the second distance 154. See FIG. 2. A rigid object having a length greater than the first distance 152 would not be able to pass between the proximate section 110 of the fuel filler pipe 100 and the intermediate section 130 of the fuel filler pipe 100. A rigid object having a length greater than the second distance 154 would not be able to pass between the intermediate section 130 of the fuel filler pipe 100 and the distal section 120 of the fuel filler pipe 100.

The anti-siphon device 1 of the present invention is comprised of a rigid body member 10 and a restriction element 30. The body member 10 has a hollow interior 20, is substantially open at its proximate end 12 to allow fuel 400 to enter into its hollow interior 20, and is partially open at its distal end 14 to allow fuel 400 to exit from its hollow interior 20. The outside diameter 18 of the body member 10 must be less than the inside diameter 138 of the intermediate section 130 of the fuel filler pipe 100. However, the difference between the outside diameter 18 of the body member 10 and the inside diameter 138 of the intermediate section 130 of the fuel filler pipe 100 should be less than the outside diameter of a siphon hose 300. Having such a small difference between the outside diameter 18 of the body member 10 and the inside diameter 138 of the intermediate section 130 of the fuel filler pipe 100 prevents a siphon hose 300 from being inserted between the body member 10 and the inner surface of the intermediate section 130 of the fuel filler pipe 100.

Figure 3:
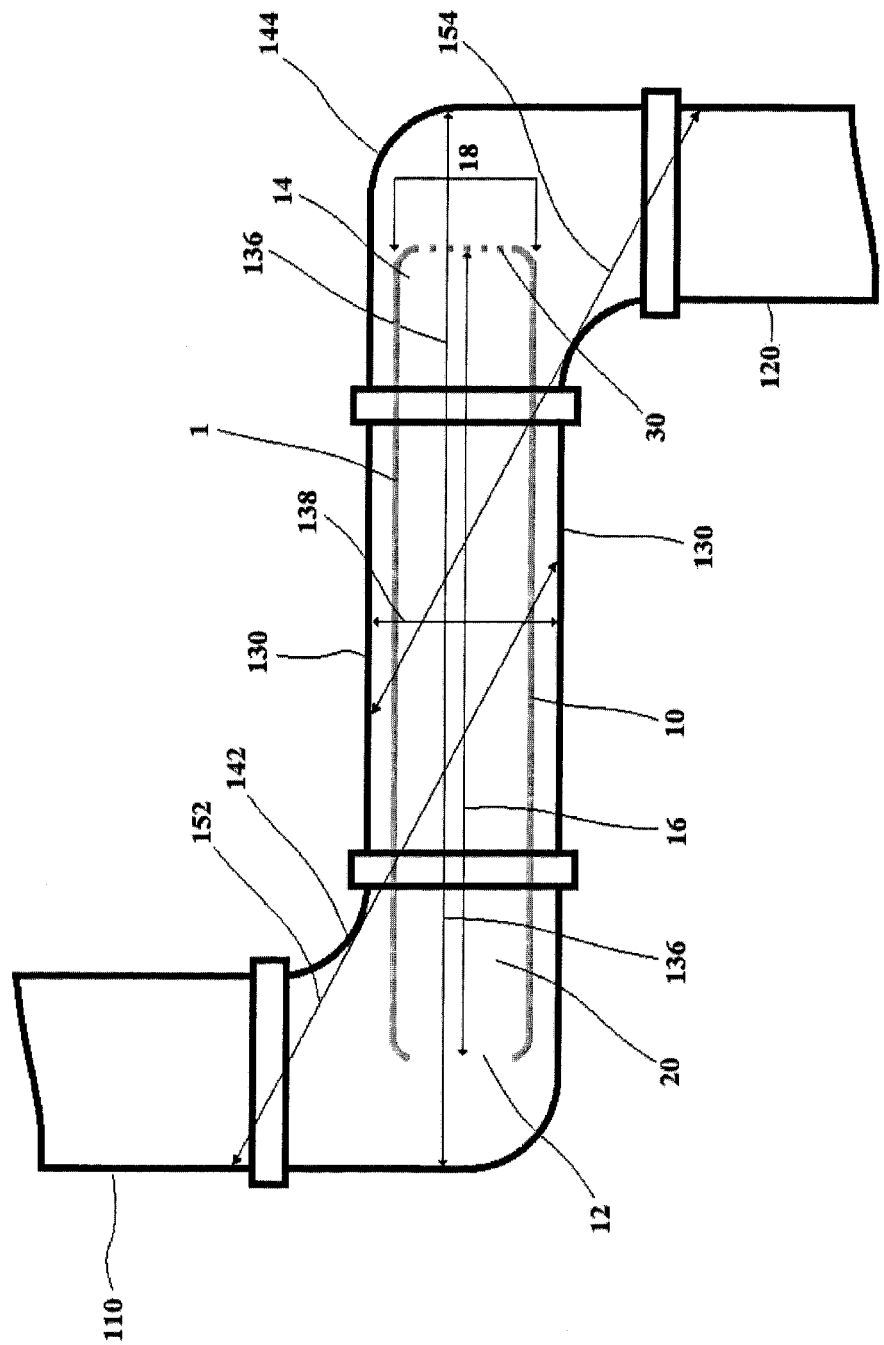
FIG. 3 is a schematic side view of the fuel filler pipe and the device of the present invention shown in FIG. 2, with the device installed within the fuel filler pipe.

The length 16 of the body member 10 must be less than the total length 136 of the intermediate section 130 of the fuel filler pipe 100. The length 16 of the body member 10 must also be greater than the first distance 152 and greater than the second distance 154. So configured, the body member 10 will fit within the intermediate section 130 of the fuel filler pipe 100, with its proximate end 12 oriented towards the proximate section 110 of the fuel filler pipe 100 and its distal end 14 oriented towards the distal section 120 of the fuel filler pipe 100. When so placed into the intermediate section 130 of the fuel filler pipe 100, the body member 10 cannot then pass into either the proximate section 110 of the fuel filler pipe 100 or into the distal section 120 of the fuel filler pipe 100. See FIGS. 2 and 3.

Figure 4B:
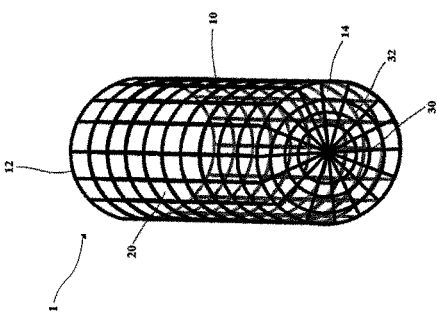
FIG. 4B is a perspective front view of another embodiment of the device of the present invention, whereby the device is comprised of a wire cage structure.
Figure 4C:
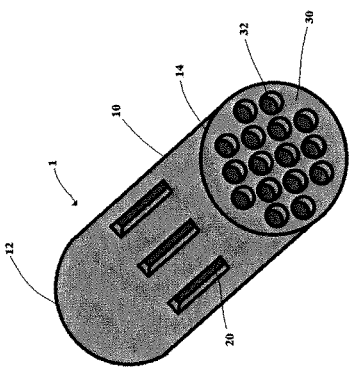
FIG. 4C is a perspective side view of yet another embodiment of the device of the present invention, whereby the device is comprised of a body member with substantially contiguous sides and side apertures and the restriction element comprises a plurality of circular apertures.
Figure 4A:
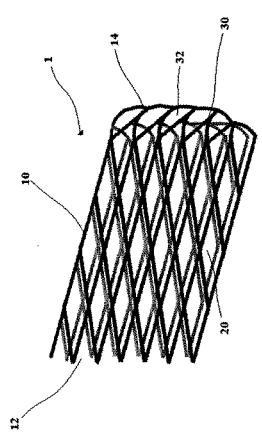
FIG. 4A is a perspective side view of one embodiment of the device of the present invention, whereby the device is comprised of intersecting rigid members forming a lattice.
Figure 5:
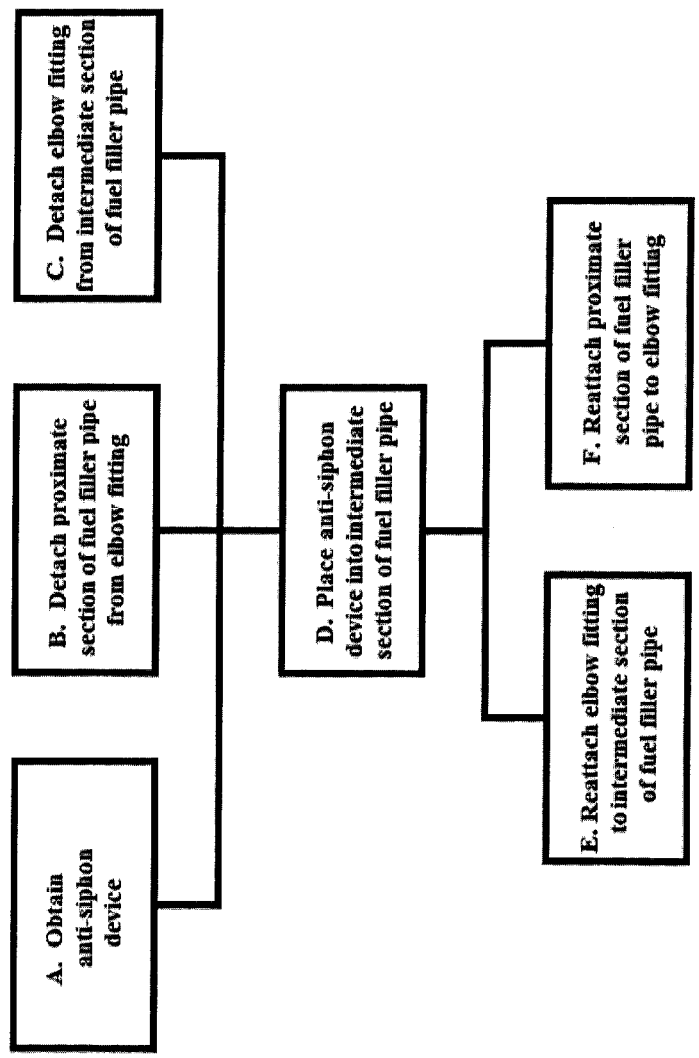
FIG. 5 is a flow chart of one embodiment of the method of the present invention.

The body member 10 of the anti-siphon device 1 may be constructed out of any suitable material that is both rigid and durable. In the preferred embodiment it is constructed out of a metallic material, such as galvanized steel. It may also be constructed out of plastics, composites, and the like. The body member 10 should have a substantially cylindrical, elongate shape. It may have contiguous side walls, or side walls with apertures. In one embodiment the body member 10 is comprised of intersecting rigid members in the form of a lattice. See FIG. 4A. In another embodiment the body member 10 may be comprised of a cylindrical wire cage. See FIG. 4B. In yet another embodiment the body member 10 may be comprised of a contiguous sidewall with no or only a few apertures. See FIG. 4C. These and other configurations for the body member 10 are contemplated by the present invention.

In addition to the body member 10, the anti-siphon device 1 is further comprised of a restriction element 30. The restriction element 30 is located at the distal end 14 of the body member 10. The restriction element 30 can have any suitable configuration, provided that it has one or more apertures 32. Each of these apertures 32 must be sufficiently large to permit fuel 400 to pass through. However, each aperture 32 must also be sufficiently small to prevent the end of a siphon hose 300 from passing through. The restriction element 30 may be a separate component that is fixedly attached to the body member 10. It may also be formed monolithically from the body member 10. See FIG. 4A. The restriction element 30 may be constructed out of any suitable material that is both rigid and durable. In the preferred embodiment it is constructed out of a metallic material, such as galvanized steel. It may also be constructed out of plastics, composites, and the like.

The restriction element 30 can have any suitable shape. It may be substantially planar and oriented substantially perpendicular to the longitudinal axis of the body member 10. It may have a convex shape in relation to the interior 20 of the body member 10. It may be comprised of intersecting rigid members in the form of a lattice. See FIG. 4A. It may be a circular grid having a hub and spoke configuration. See FIG. 4B. It may be planar with a plurality of circular apertures 32. See FIG. 4C. Where there are multiple apertures 32, in one embodiment each of the apertures 32 may be of the same size as the other apertures 32, while in another embodiment at least some of the apertures 32 may be of different sizes than some of the other apertures 32. In another embodiment, the restriction element 30 may be comprised of a substantially spherical coil of wire that fills the distal end 14 of the body member 10. Fuel 400 may easily pass through the coil of wire, but a siphon hose 300 cannot. These and other configurations of the restriction element 30 are contemplated by the present invention.

The present invention also contemplates a method for installing the anti-siphon device 1 herein disclosed within the fuel filler pipe 100 configured as described above. The method requires the intermediate section 130 of the fuel filler pipe 100 to have a removable first elbow fitting 162 at its proximate end. The first elbow 162 must be in removable connection with the proximate section 110 of the fuel filler pipe 100.

The method of installing the anti-siphon device 1 within the fuel filler pipe 100 comprises the following steps:

Step A. Obtain an anti-siphon device 1 configured as disclosed herein.

Step B. Detach the proximate section 110 of the fuel filler pipe 100 from the first elbow 162 of the intermediate section 130 of the fuel filler pipe 100.

Step C. Detach the first elbow 162 from the intermediate section 130 of the fuel filler pipe 100.

Step D. Place the anti-siphon device 1 into the intermediate section 130 of the fuel filler pipe 100 such that its proximate end 12 is oriented towards the proximate end of the intermediate section 130 of the fuel filler pipe 100 and its distal end 14 is oriented towards the distal end 14 of the intermediate section 130 of the fuel filler pipe 100.

Step E. Reattach the first elbow 162 to the proximate end of the intermediate section 130 of the fuel filler pipe 100

Step F. Reattach the proximate section 110 of the fuel filler pipe 100 to the first elbow 162.

Steps A, B, and C of the method may be performed in any order relative to each other. That is, the first elbow 162 may be removed from the intermediate section 130 of the fuel filler pipe 100 before it is removed from the proximate section 110 of the fuel filler pipe 100, or vice versa. The anti-siphon device 1 can be obtained before the first elbow 162 is removed from either or both of the sections of fuel filler pipe 100, or after. Step D, however, may only be performed after steps A, B, and C. Similarly, Steps E and F are performed only after Step D. However, steps E and F may be performed in any order relative to each other. That is, the first elbow 162 may be reattached to the intermediate section 130 of the fuel filler pipe 100 either before or after the first elbow 162 is reattached to the proximate section 110 of the fuel filler pipe 100. In the preferred embodiment, however, Step B is performed before Step C and Step E is performed before Step F; that is, first the proximate end of the fuel filler pipe 100 is detached from the first elbow 162 and then the first elbow 162 is detached from the intermediate section 130 of the fuel filler pipe 100, and the first elbow 162 is first reattached to the intermediate section 130 of the fuel filler pipe 100 and then the proximate section 110 of the fuel filler pipe 100 is reattached to the first elbow 162.

Additional steps are also contemplated by the method of the present invention, such as Step D1—clean the interior of the intermediate section 130 of the fuel filler pipe 100. Step D1 occurs after Step C and before Step D. Similarly, Steps B1—clean the distal end of the proximate section 110 of the fuel filler pipe 100—and Step C1—clean both ends of the first elbow 162—may also be performed. Step B1 occurs after Step B and before Step F, and Step C1 occurs after Step C and before Steps E and F.

I claim:

1. An anti-siphon device, said device configured to be located within a fuel filler pipe, said fuel filler pipe having a proximate section with an opening suitable for receiving fuel, a distal section with an opening in communication with a fuel tank, and an intermediate section having a length and interposed between and connected to the proximate section of said fuel filler pipe and the distal section of said fuel filler pipe, with the intermediate section of said fuel filler pipe oriented at a first angle to the proximate section of said fuel filler pipe and the intermediate section of said fuel filler pipe oriented at a second angle to the distal section of said fuel filler pipe, with a first distance being a longest straight line distance from the proximate section of said fuel filler pipe to the intermediate section of said fuel filler pipe, and a second distance being a longest straight line distance from the distal section of said fuel filler pipe to the intermediate section of said fuel filler pipe, said anti-siphon device comprising
- a substantially rigid body member, said body member having a length, an outside diameter, a proximate end, a distal end, and a hollow interior,
  - with the length of said body member being less than the length of the intermediate section of the fuel filler pipe, greater than the first distance, and greater than the second distance,
  - an outside diameter of said body member being less than an inside diameter of the intermediate section of the fuel filler pipe,
  - the proximate end of said body member being substantially open to allow fuel to enter into the hollow interior of said body member, and
  - the distal end of said body member being partially open to allow fuel to exit from the hollow interior of said body member; and
- a restriction element located at the distal end of said body member, said restriction element having one or more apertures, each of said apertures being sufficiently large to permit fuel to pass therethrough and sufficiently small to prevent a siphon hose from passing therethrough;
- whereby the device is placed within the intermediate section of the fuel filler pipe with the proximate end of the body member oriented towards the proximate section of the fuel filler pipe and the distal end of the body member oriented towards the distal section of the fuel filler pipe, wherein fuel introduced into said fuel filler pipe through the opening of the proximate section of said fuel filler pipe flows through the proximate section of said fuel filler pipe, through the intermediate section of said fuel filler pipe, through the device, through the distal section of said fuel filler pipe, and through the opening of the distal section of said fuel filler pipe into the fuel tank.

2. The device of claim 1 wherein body member is substantially cylindrical in shape.

3. The device of claim 1 wherein the body member is comprised of intersecting rigid members in the form of a lattice.

4. The device of claim 1 wherein the body member is constructed of a metallic material.

5. The device of claim 1 wherein the first angle is substantially ninety degrees and the second angle is substantially ninety degrees.

6. The device of claim 1 wherein the intermediate section of the fuel filler pipe further comprises a first elbow and a second elbow, with the first elbow being located at the proximate end of the intermediate section of the said filler pipe and being in connection with the proximate section of the fuel filler pipe, and the second elbow being located at the distal end of the intermediate section of the fuel filler pipe and being in connection with the distal section of the fuel filler pipe.

7. The device of claim 6 wherein the first elbow is substantially ninety degrees and the second elbow is substantially ninety degrees.

8. The device of claim 1 wherein the restriction element is constructed of a metallic material.

9. The device of claim 1 wherein the restriction element is substantially planar and is oriented substantially perpendicular to a longitudinal axis of the body member.

10. The device of claim 1 wherein the restriction element is fixedly attached to the distal end of the body member.

11. The device of claim 1 wherein the restriction element is integrated with the distal end of the body member.

12. The device of claim 1 wherein the body member and the restriction element are formed of a monolithic unit.

13. The device of claim 1 wherein the restriction element is comprised of intersecting rigid members in the form of a lattice.

14. The device of claim 1 wherein the restriction element is comprised of a plurality of apertures.

15. The device of claim 14 wherein each of the apertures of the restriction element is substantially the same size as each other of the apertures of the restriction element.

16. The device of claim 1 wherein the restriction element has a substantially convex shape relative to the hollow interior of the body member.

17. A method for installing an anti-siphon device within a fuel filler pipe,
- said fuel filler pipe having
  - a proximate section with an opening suitable for receiving fuel;
  - a distal section with an opening in communication with a fuel tank;
  - an intermediate section having
    - a length, a proximate end, a distal end, and a first elbow, said first elbow being located at the proximate end of said intermediate section of said fuel filler pipe and in removable connection with the proximate end of said intermediate section of said fuel filler pipe,
    - said intermediate section of said fuel filler pipe being interposed between the proximate section of said fuel filler pipe and the distal section of said fuel filler pipe,
    - with said first elbow of said intermediate section of said fuel filler pipe being in removable connection with said proximate section of said fuel filler pipe and said distal end of said intermediate section of said fuel filler pipe being in connection with said distal section of said fuel filler pipe, and
    - with said intermediate section of said fuel filler pipe oriented at a first angle to the proximate section of said fuel filler pipe and said intermediate section of said fuel filler pipe oriented at a second angle to the distal section of said fuel filler pipe;
  - a first distance being a longest straight line distance from the proximate section of said fuel filler pipe to the intermediate section of said fuel filler pipe; and
  - a second distance being a longest straight line distance from the distal section of said fuel filler pipe to the intermediate section of said fuel filler pipe; and
- said anti-siphon device having
  - a substantially rigid body member, said body member having a length, an outside diameter, a proximate end, a distal end, and a hollow interior,
    - with the length of said body member being less than the length of the intermediate section of the fuel filler pipe, greater than the first distance, and greater than the second distance,
    - the outside diameter of said body member being less than an inside diameter of the intermediate section of the fuel filler pipe,
    - the proximate end of said body member being substantially open to allow fuel to enter into the hollow interior of said body member, and
    - the distal end of said body member being partially open to allow fuel to exit from the hollow interior of said body member; and a restriction element located at the distal end of said body member, said restriction element having one or more apertures, each of said apertures being sufficiently large to permit fuel to pass therethrough and sufficiently small to prevent a siphon hose from passing therethrough;

said method comprising the following steps:

A. obtain the anti-siphon device;

B. detach the proximate section of the fuel filler pipe from the first elbow of the intermediate section of the fuel filler pipe;

C. detach the first elbow of the intermediate section of the fuel filler pipe from the intermediate section of the fuel filler pipe;

D. place the anti-siphon device into the intermediate section of the fuel filler pipe such that the proximate end of the body member of the anti-siphon device is oriented towards the proximate end of the intermediate section of the fuel filler pipe and the distal end of the body member of the anti-siphon device is oriented towards the distal end of the intermediate section of the fuel filler pipe;

E. reattach the first elbow of the intermediate section of the fuel filler pipe to the proximate end of the intermediate section of the fuel filler pipe;

F. reattach the proximate section of the fuel filler pipe to the first elbow of the intermediate section of the fuel filler pipe;

wherein steps A, B, and C may be performed in any order relative to each other; step D is performed after steps A, B, and C and before steps E and F; and steps E and F are performed in any order relative to each other.

18. The method of claim 17 wherein step B is performed before step C and step E is performed before step F.

19. The method of claim 17 wherein the body member is substantially cylindrical in shape, is comprised of intersecting rigid members in the form of a lattice, and is constructed of a metallic material.

20. The method of claim 17 wherein the restriction element is located at the distal end of said body member, is comprised of intersecting rigid members in the form of a lattice thereby providing a plurality of apertures, and is constructed of a metallic material.

* * * * *